(12) United States Patent
Wessely (10) Patent No.: US 11,059,643 B2
(45) Date of Patent: Jul. 13, 2021

(54) MOLDED PLASTIC FILM ARTICLE, MANUFACTURING METHOD, AND BLISTER

(71) Applicant: GIESECKE+DEVRIENT CURRENCY TECHNOLOGY GMBH, Munich (DE)

(72) Inventor: Stephan Wessely, Munich (DE)

(73) Assignee: Giesecke+Devrient Currency Technology GmbH, Munich (DE)

( * ) Notice: Subject to any disclaimer, the term of this patent is extended or adjusted under 35 U.S.C. 154(b) by 246 days.

(21) Appl. No.: 16/067,267

(22) PCT Filed: Dec. 22, 2016

(86) PCT No.: PCT/EP2016/002161
§ 371 (c)(1),
(2) Date: Jun. 29, 2018

(87) PCT Pub. No.: WO2017/114590
PCT Pub. Date: Jul. 6, 2017

(65) Prior Publication Data
US 2019/0009963 A1    Jan. 10, 2019

(30) Foreign Application Priority Data

Dec. 30, 2015 (DE) .................. 10 2015 016 911.4
Jan. 21, 2016 (DE) .................. 10 2016 000 592.0

(51) Int. Cl.
*B65D 75/32* (2006.01)
*A61J 1/03* (2006.01)
(Continued)

(52) U.S. Cl.
CPC ............ *B65D 75/327* (2013.01); *A61J 1/035* (2013.01); *B32B 3/266* (2013.01); *B32B 3/30* (2013.01);
(Continued)

(58) Field of Classification Search
CPC ............ B65D 75/30–368; A61J 1/035; B32B 2307/40; B32B 2307/402;
(Continued)

(56) References Cited

U.S. PATENT DOCUMENTS 6,244,442 B1   6/2001   Inoue et al.
9,274,258 B2   3/2016   Fuhse et al.
(Continued)

FOREIGN PATENT DOCUMENTS

DE      19613960 A1    10/1997
DE   102008037128 A1    2/2010
(Continued)

OTHER PUBLICATIONS

German Search Report from DE Application No. DE102016000592. 0, dated Oct. 12, 2016.
(Continued)

*Primary Examiner* — Kregg T Brooks
(74) *Attorney, Agent, or Firm* — Workman Nydegger (57) ABSTRACT

A plastic foil molded part for a blister, in particular a tablet blister, comprises a transparent carrier substrate having a semitransparent function layer. The semitransparent function layer is constituted such that the plastic foil molded part has a first, visually recognizable color upon viewing in incident light and has a second, visually recognizable color upon viewing in transmitted light.

17 Claims, 5 Drawing Sheets

(51) Int. Cl.
  *B32B 7/12* (2006.01)
  *B32B 27/08* (2006.01)
  *B32B 27/30* (2006.01)
  *B32B 3/26* (2006.01)
  *B32B 3/30* (2006.01)
  *B32B 27/32* (2006.01)

(52) U.S. Cl.
  CPC ............... *B32B 7/12* (2013.01); *B32B 27/08* (2013.01); *B32B 27/304* (2013.01); *B32B 27/306* (2013.01); *B32B 27/32* (2013.01); *B32B 27/322* (2013.01); *B32B 27/325* (2013.01); *A61G 2205/20* (2013.01); *B32B 2250/03* (2013.01); *B32B 2250/242* (2013.01); *B32B 2250/246* (2013.01); *B32B 2255/10* (2013.01); *B32B 2255/205* (2013.01); *B32B 2255/28* (2013.01); *B32B 2307/31* (2013.01); *B32B 2307/40* (2013.01); *B32B 2307/402* (2013.01); *B32B 2307/41* (2013.01); *B32B 2307/412* (2013.01); *B32B 2307/514* (2013.01); *B32B 2307/738* (2013.01); *B32B 2439/80* (2013.01)

(58) Field of Classification Search
  CPC ........ B32B 2307/404; B32B 2307/414; B32B 2307/416; B32B 2307/418; B32B 2307/42; B32B 2439/80; C09D 5/29
  See application file for complete search history.

(56) References Cited

U.S. PATENT DOCUMENTS

| | | | |
|---|---|---|---|
| 9,387,718 | B2 | 7/2016 | Mayrhofer et al. |
| 2001/0032796 | A1 | 10/2001 | Rubenstein |
| 2003/0102247 | A1 | 6/2003 | Inoue et al. |
| 2011/0139024 | A1 | 6/2011 | Schiffmann |
| 2012/0170124 | A1 | 7/2012 | Fuhse et al. |
| 2012/0242075 | A1 | 9/2012 | Lochbihler |
| 2012/0298545 | A1* | 11/2012 | Denzler ............... B65D 75/367 206/461 |
| 2012/0301639 | A1* | 11/2012 | Grigorenko ............ B05D 3/007 428/29 |
| 2014/0342105 | A1* | 11/2014 | Mayrhofer ........... B42D 25/387 428/29 |
| 2015/0258838 | A1 | 9/2015 | Fuhse |
| 2015/0352886 | A1* | 12/2015 | Holmes ................. B42D 25/29 359/2 |

FOREIGN PATENT DOCUMENTS

| | | |
|---|---|---|
| DE | 102009041583 A1 | 3/2011 |
| DE | 102009058243 A1 | 6/2011 |
| EP | 1876033 A1 | 1/2008 |
| EP | 2578414 A1 | 4/2013 |
| WO | 9710159 A1 | 3/1997 |
| WO | 2005051675 A2 | 6/2005 |
| WO | 2006056216 A1 | 6/2006 |
| WO | 2009000403 A1 | 12/2008 |
| WO | 2010139409 A1 | 12/2010 |
| WO | 2011032665 A1 | 3/2011 |
| WO | 2011064162 A2 | 6/2011 |
| WO | 2011082761 A1 | 7/2011 |
| WO | 2014060089 A2 | 4/2014 |

OTHER PUBLICATIONS

International Search Report from PCT Application No. PCT/EP2016/002161, dated Feb. 13, 2017.

* cited by examiner

MOLDED PLASTIC FILM ARTICLE, MANUFACTURING METHOD, AND BLISTER

BACKGROUND

The invention relates to a plastic foil molded part provided with a semitransparent function layer. The invention additionally relates to a blister, in particular a tablet packaging or a tablet blister, comprising a plastic foil molded part provided with a semitransparent function layer and a cover foil. The invention further relates to a method for manufacturing the plastic foil molded part provided with a semitransparent function layer.

A blister or a display packaging is understood to be a product packaging which enables the potential buyer to perceive the packaged object optically or to at least guess the form of the object. The object is fixed here by a plastic foil molded part closed with a cover foil. In the case of drugs, e.g. tablets, the cover foil mostly consists of aluminum. A tablet packaging or a tablet blister is also called a push-through packaging. The arrangement of the tablets in individual depressions or cavities of the plastic foil molded part, which is sealed by the aluminum foil, is an advantage in terms of hygienic, because undesirable influences, such as high air humidity or dirt are excluded.

The manufacturing of blisters is described, e.g., in WO 97/010159 A1.

EP 1 876 033 A1 describes a packaging material, in particular for the pharmaceutical field, which has a metallic carrier substrate with a line grid printed in two different visually recognizable colors.

The present invention is based on the general object of configuring the packaging known in the prior art more customer-friendly. Furthermore, the present invention is based on the preferred object of increasing the forgery resistance of the packagings of the prior art.

The object is achieved by the feature combinations defined in the independent claims. Developments of the invention are subject matter of the subclaims.

SUMMARY OF THE INVENTION 1. (First aspect of the invention) A plastic foil molded part for a blister, in particular a tablet blister, comprising a transparent carrier substrate having a semitransparent function layer, wherein the semitransparent function layer is constituted such that the plastic foil molded part has a first, visually recognizable color upon viewing in incident light and has a second, visually recognizable color upon viewing in transmitted light.

The plastic foil molded part has, e.g., a depression or cavity or several depressions or cavities, the depressions or cavities being suitable for receiving objects to be packed, e.g., tablets. The plastic foil molded part can be sealed or closed in particular by a cover foil, e.g. an aluminum foil.

In a blister, which is composed of the plastic foil molded part according to the invention, a cover foil and the packaged good (e.g. tablets), the color change can be perceived particularly well upon viewing in transmitted light, on the one hand, and upon viewing in incident light, on the other hand, when the cover foil is transparent or when the opaque cover foil configured as a push-through foil is no longer present in the region of the packaged good (e.g. a tablet) which was removed from the blister or pushed through.

The transparent carrier substrate of the plastic foil molded part is based, e.g., on one of the following materials which can be respectively present as a single layer or in the form of several layers:
PVC (polyvinyl chloride),
PVDC (polyvinylidene chloride),
PVC/PVDC multi-layer arrangement,
PVC/PE/PVDC multi-layer arrangement,
PVC/ACLAR® multi-layer arrangement,
PP (polypropylene),
PET (polyester),
PS (polystyrene),
COP (cycloolefin polymer),
COC (cycloolefin copolymer),
COC/COC multi-layer arrangement,
PP/COC/PP multi-layer arrangement,
PP/COC/EVOH/PP multi-layer arrangement,
PETG/COC/PETG multi-layer arrangement,
PVC/COC/PVC multi-layer arrangement,
COC coated with PVDC,
PETG/PCTFE multi-layer arrangement,
PETG/EVOH/PCTFE multi-layer arrangement,
PVC/PCTFE multi-layer arrangement,
PVC/PE/PCTFE multi-layer arrangement,
PVC/PCTFE/PVC multi-layer arrangement, and
PVC/EVOH/PCTFE-multi-layer arrangement.

In the case that the transparent carrier substrate of the plastic foil molded part is based on a multi-layer arrangement, two single layers can be connected with each other in particular by means of an adhesive layer (e.g. PVDC/adhesive layer/PVC structure, PVDC/adhesive layer/PE/adhesive layer/PVC structure, or PP/adhesive layer/COC/adhesive layer/PP structure). Instead of an adhesive layer, for connecting two single layers of a multi-layer arrangement there can be used a polymeric heat seal layer which is obtainable, e.g., by means of coextrusion. As a polymeric heat seal layer there is suitable, e.g., polyethylene copolymer.

The transparent carrier substrate of the plastic foil molded part can be provided with the semitransparent function layer, e.g., on its back side (i.e. directed towards the packaged object) or on its front side (i.e. on the side opposing the packaged object). In the case that the transparent carrier substrate is based on a multi-layer arrangement, the semitransparent function layer can be present, e.g., in the interior of the multi-layer arrangement, i.e. an interior layer of the multi-layer arrangement can be provided with the semitransparent function layer on its front side or on its back side.

In the case that the semitransparent function layer is based on a multi-layer structure (see the description below), in particular a part of the multi-layer structure can be present on the front side of the transparent carrier substrate of the plastic foil molded part and the other part of the multi-layer structure can be present on the back side of the transparent carrier substrate of the plastic foil molded part.

In the case that the semitransparent function layer is based on a multi-layer structure and the transparent carrier substrate of the plastic foil molded part is based on a multi-layer arrangement, in particular a part of the multi-layer structure of the semitransparent function layer can be present on the front side of a (in particular interior) layer of the transparent carrier substrate of the plastic foil molded part and the other part of the multi-layer structure of the semitransparent function layer can be present on the back side of the (in particular interior) layer of the transparent carrier substrate of the plastic foil molded part. In this way, the semitransparent function layer is excellently protected from external influences.

The semitransparent function layer is obtainable, e.g., by means of vapor deposition or by printing technology. The semitransparent function layer can have a single-layer or a multi-layer structure. In the case of a multi-layer structure it is possible that all layers are produced by means of vapor deposition; alternatively, it is possible that one or several layers are produced by means of vapor deposition and one further or several further layers are produced by printing technology (for example, two semitransparent metallic layers produced by means of vapor deposition and one intermediate dielectric layer based on nitrocellulose and obtainable by printing technology). Furthermore, the semitransparent function layer can be present, e.g., in the form of a continuous coating or be present in the form of a discontinuous coating produced, e.g., from metallic pigments or effect pigments. Concrete examples with regard to the semitransparent function layer are in particular the following layer systems A), B), C) and D):

A) two semitransparent metallic layers and one intermediate dielectric layer;
B) two semitransparent metallic layers and one intermediate color layer, preferably 1 to 2 micrometers thick (e.g. of blue color); preferably, the two semitransparent metallic layers are respectively additionally coated with a further color layer, preferably 1 to 2 micrometers thick, at the outer side, in particular in a complementary color to the color layer arranged between the metallic layers (e.g. in yellow color) (in this manner there arises the following layer structure with a gold/blue color change in a view in incident light or transmitted light: yellow printed layer-semitransparent metallic layer-blue printed layer-semitransparent metallic layer-yellow printed layer); furthermore, e.g., the following layer system comprising the layers a) to c) is possible: a) yellow colored, "silver" mirror layer obtainable by means of yellow colored metal pigments which are known from WO 2005/051675 A2 (the metal pigments are based on a metal which is chosen preferably from the group consisting of aluminum, stainless steel, nichrome, gold, silver, platinum and copper; the metal is particularly preferably aluminum, the average particle diameter being preferably in a range of 8 to 15 further preferably in a range of 9 to measured with a Coulter LS130 laser diffraction granulometer; such a printing ink enables the supply of a "silver" mirror layer), b) blue color layer, preferably 1 to 2 micrometers thick, c) yellow colored, "silver" mirror layer obtainable by means of yellow colored metal pigments which are known from WO 2005/051675 A2 (see the description of layer a);
C) the above layer system can alternatively be configured in such a way that some of the layers are arranged on the front side of a carrier substrate layer of the plastic foil molded part (in particular an interior layer (e.g. COC) of a plastic foil molded part carrier substrate based on a multi-layer arrangement (e.g. PP/COC/PP)) and some layers are arranged on the back side of the carrier substrate layer of the plastic foil molded part; e.g., the following layer system comprising the layers a) to f) is possible: a) yellow color layer, preferably 1 to 2 micrometers thick, b) semitransparent metallic layer (e.g. aluminum), c) carrier substrate layer (e.g. COC), d) blue color layer, preferably 1 to 2 micrometers thick, e) semitransparent metallic layer (e.g. aluminum), f) yellow color layer, preferably 1 to 2 micrometers thick; furthermore, e.g., the following layer system comprising the layers a) to d) is possible: a) yellow colored, "silver" mirror layer obtainable by means of yellow colored metal pigments which are known from WO 2005/051675 A2 (the metal pigments are based on a metal which is chosen preferably from the group consisting of aluminum, stainless steel, nichrome, gold, silver, platinum and copper; the metal is particularly preferably aluminum, the average particle diameter being preferably in a range of 8 to 15 $\mu$m, further preferably in a range of 9 to 10 $\mu$m, measured with a Coulter LS130 laser diffraction granulometer; such a printing ink enables the supply of a "silver" mirror layer), b) carrier substrate layer (e.g. COC), c) blue color layer, preferably 1 to 2 micrometers thick, d) yellow colored, "silver" mirror layer obtainable by means of yellow colored metal pigments which are known from WO 2005/051675 A2 (see the description of layer a));
D) the layer systems mentioned above in B) and C) can, of course, be varied with respect to the yellow color layer and the blue color layer to the effect that different colors are used instead of yellow or blue, which are in particular complementary to each other.

Basically, the plastic foil molded part can be provided over its full area with the semitransparent function layer. Furthermore, the semitransparent function layer can be present merely in a partial area or in several partial areas. For example, the plastic foil molded part can be constituted such that the semitransparent function layer has recesses which are congruent with the cavities of the plastic foil molded part. In case the plastic foil molded part is covered with a transparent cover foil, the viewer perceives in this case only in the regions outside the cavities upon viewing in incident light a first, visually recognizable color and upon viewing in transmitted light a second, visually recognizable color.

2. (Preferred embodiment) Plastic foil molded part according to section 1, wherein the plastic foil molded part is constituted such that in the case of the presence of packaged objects, e.g., tablets, and the presence of an opaque cover foil closing the plastic foil molded part, a packaged object removed by the consumer is recognizable in the form of a motif formed by the first, visually recognizable color and the second, visually recognizable color upon viewing the plastic foil molded part from the side opposing the cover foil in transmitted light due to the absence of the opaque cover foil in the region of the removed object.

3. (Preferred embodiment) Plastic foil molded part according to section 1 or 2, wherein the semitransparent function layer has a multi-layer structure with two semitransparent metallic layers and a dielectric layer arranged between the two semitransparent metallic layers.

4. (Preferred embodiment) Plastic foil molded part according to section 3, wherein the two semitransparent metallic layers are formed independently of each other from a metal and the metal is respectively chosen from the group consisting of Al, Ag, Ni, Cr, Cu, Au and an alloy of one or several of the hereinabove mentioned elements and the dielectric layer is an $SiO_2$ layer, a ZnO layer, an $Al_2O_3$ layer, a $TiO_2$ layer, a layer made of a nitride or oxynitride of one of the elements Si, Zn, Al or Ti, or an $MgF_2$ layer, or a nitrocellulose layer obtainable, e.g., by printing technology.

5. (Preferred embodiment) Plastic foil molded part according to section 4, wherein the two semitransparent metallic layers are chosen from Al or Ag and the dielectric layer is an $SiO_2$ layer.

6. (Preferred embodiment) Plastic foil molded part according to any of sections 3 to 5, wherein the plastic foil molded part appears golden upon viewing in incident light and has a blue color tone upon viewing in transmitted light.

7. (Preferred embodiment) Plastic foil molded part according to any of sections 1 or 2, wherein the semitransparent function layer is obtainable by printing technology by means of an effect pigment composition.

8. (Preferred embodiment) Plastic foil molded part according to any of sections 1 to 7, wherein the transparent carrier substrate of the plastic foil molded part is based on a multi-layer arrangement with at least two layers and the semitransparent function layer is arranged between the two layers, or the transparent carrier substrate of the plastic foil molded part is based on a multi-layer arrangement with at least one interior layer and two cover layers and the semitransparent function layer is arranged between the interior layer and one of the two cover layers, the multi-layer arrangement being chosen preferably from the group of the following elements:
PVC/PVDC multi-layer arrangement,
PVC/PE/PVDC multi-layer arrangement,
PVC/ACLAR® multi-layer arrangement,
COC/COC multi-layer arrangement,
PP/COC/PP multi-layer arrangement,
PP/COC/EVOH/PP multi-layer arrangement,
PETG/COC/PETG multi-layer arrangement,
PVC/COC/PVC multi-layer arrangement,
COC coated with PVDC,
PETG/PCTFE multi-layer arrangement,
PETG/EVOH/PCTFE multi-layer arrangement,
PVC/PCTFE multi-layer arrangement,
PVC/PE/PCTFE multi-layer arrangement,
PVC/PCTFE/PVC multi-layer arrangement, and
PVC/EVOH/PCTFE-multi-layer arrangement.

9. (Preferred embodiment) Plastic foil molded part according to section 8, wherein the transparent carrier substrate of the plastic foil molded part is based on a multi-layer arrangement with at least one interior layer and two cover layers and the semitransparent function layer is arranged between the interior layer and one of the two cover layers, the interior layer being a COC layer and the two cover layers respectively being a PP layer.

10. (Second aspect of the invention) Blister or blister packaging, in particular tablet blister, comprising a plastic foil molded part according to any of sections 1 to 9 and a preferably opaque cover foil, wherein the plastic foil molded part defines the front side of the blister and the cover foil defines the back side of the blister.

The cover foil is in particular a push-through foil for a push-through packaging, in which the push-through foil locks the packaged good (e.g. pharmaceutical products, such as tablets) but can be torn open or broken open by pushing through the packaged good. The capability of breaking open can be additionally increased by mechanical impact, e.g., by means of perforations and or cutting grooves and/or thinned regions in the cover foil (which are obtainable, e.g., by means of embossing). The cover foil is preferably opaque, but transparent or semitransparent cover foils are also suitable. The cover foil is based in particular on one of the following materials:
suitable in particular for manufacturing opaque cover foils:
  aluminium, in particular hard aluminum, soft aluminum, paper aluminum combination or paper polyester aluminum laminate; aluminum is preferred in particular in the case of an opaque cover foil;
polyolefin resin; in particular polypropylene or polypropylene having an inorganic filler, the inorganic filler being, e.g., calcium carbonate, talc, aluminum oxide, titanium dioxide, diatomaceous earth, clay, kaolin, chalk, glass fiber or a mixture of two or several of the above-mentioned substances (depending on the filler content, in particular semitransparent or transparent cover foils can be obtained);
suitable in particular for manufacturing transparent cover foils: cycloolefin copolymer (COC) or cycloolefin polymer (COP); or films which contain at least one layer of cycloolefin copolymer (COC) or cycloolefin polymer (COP), e.g., films with the structure COC/PE/COC or COC/PE-LLD/COC or a film with a COC core layer (e.g., the following layer sequence: polymeric thermal protection layer (preferably chosen from COC, COP, PP, PA or PET)-COC core layer-polymeric heat seal layer), described in WO 2009/000403 A1 or in WO 2010/139409 A1;
oriented polyethylene terephthalate (OPET); or an OPET film which with a polyethylene layer or a polypropylene layer is combined into a laminate, and the laminate can have, where applicable, cutting grooves or notches;
suitable in particular for manufacturing transparent cover foils: polymer phase containing polyolefin (A), in which a hydrocarbon resin component (B) is contained in dissolved form, the hydrocarbon resin component (B) being different from the polyolefin (A) and comprising cyclic side groups at the polymer chain and being contained with a portion of at least 3 wt-% in the overall mass in the carrier substrate, the average molecular weight of the hydrocarbon resin component (B) being smaller or equal to 10000; as a polyolefin (A) there are preferred polyethylene, polypropylene or a copolymer or terpolymer of ethylene and/or propylene; component (B) is in particular an amorphous polymer; such push-through foils are known from DE 196 13 960 A1;
suitable in particular for manufacturing transparent cover foils: uniaxially oriented polypropylene film irradiated with ionising radiation.

For sealing the plastic foil molded part with the cover foil, the cover foil can have in particular a heat seal lacquer (or heat seal binding agent) which is arranged, where applicable, on the cover foil by means of a heat seal lacquer priming (or adhesion promoter). Instead of the formulation "heat seal binding agent and optionally present adhesion promoter" there is also used the term "heat seal coating" herein.

11. (Preferred embodiment) Blister according to section 10, wherein the cover foil is opaque and the blister is constituted such that the region of a packaged object, e.g. a tablet, removed from the blister by the consumer, is recognizable in the form of a motif formed by the first, visually recognizable color and the second, visually recognizable color upon viewing the front side of the blister in transmitted light as a result of the part of the opaque cover foil no longer being present in this region.

12. (Preferred embodiment) Blister according to any of sections 10 or 11, wherein the blister is a blister for pharmaceutical products, preferably a tablet packaging or a tablet blister.

13. (Third aspect of the invention) Method for manufacturing a plastic foil molded part according to any of sections 1 to 9, comprising
a) the step of supplying a transparent carrier substrate;
b) the step of forming the transparent carrier substrate, preferably by means of thermoforming; and
c) the step of providing the formed transparent carrier substrate with a semitransparent function layer.

14. (Preferred embodiment) Method according to section 13, wherein in step c) the semitransparent function layer is applied by means of vapor deposition or by printing technology.

15. (Preferred embodiment) Method according to section 13, wherein the step c) is effected such that c1) a separate transparent carrier substrate which has a semitransparent function layer is supplied; and c2) the separate transparent carrier substrate having the semitransparent function layer is applied onto the formed transparent carrier substrate, e.g., by means of HPF (high-pressure forming method) or by means of an adhesive layer.

The separate transparent carrier substrate is in particular a plastic foil, e.g. a polyethylene terephthalate foil.

The separate transparent carrier substrate having a semitransparent function layer can form in the obtained plastic foil molded part, which is closed with a cover foil, in particular an interply, i.e. the obtained blister has the following structure:

plastic foil molded part (as an upper ply);
separate transparent carrier substrate, e.g. a plastic foil such as a polyethylene terephthalate foil which is provided with a semitransparent function layer (as an interply);
cover foil (as a lower ply).

In this case, the cover foil can be in particular transparent and the interply can have recesses which are congruent with the cavities of the plastic foil molded part. Thus, the viewer perceives in this case only in the regions outside the cavities upon viewing in incident light a first, visually recognizable color and upon viewing in transmitted light a second, visually recognizable color.

16. (Fourth aspect of the invention) Method for manufacturing a plastic foil molded part according to any of sections 1 to 9, comprising a) the step of supplying a transparent carrier substrate; or in the case that the transparent carrier substrate is based on a multi-layer arrangement, the step of supplying at least one layer of the multi-layer arrangement forming the transparent carrier substrate;

b) the providing of the transparent carrier substrate with a semitransparent function layer; or in the case that the transparent carrier substrate is based on a multi-layer arrangement, the providing of the at least one layer of the multi-layer arrangement forming the transparent carrier substrate with a semitransparent function layer;

c) the step of forming the transparent carrier substrate having the semitransparent function layer, obtained after the step b), preferably by means of thermoforming.

17. (Preferred embodiment) Method according to section 16, wherein in step b) the semitransparent function layer is applied by means of vapor deposition or by printing technology.

DETAILED DESCRIPTION OF THE INVENTION

In the description, the terms "plastic foil molded part" and "plastic molded foil" are used as synonyms.

The front side of the blister packaging of the invention is defined by the plastic foil molded part. The back side of the blister packaging of the invention is defined by the cover foil.

A viewing in incident light, according to this invention, is an illumination of the respective object from one side and a viewing of the object from the same side. A viewing in incident light is thus present, for example, when the front of the blister is illuminated and also viewed.

A viewing in transmitted light, according to this invention, is an illumination of the respective object from one side and a viewing of the object from the opposite side. A viewing in transmitted light is thus the case, for example, when the back side of the blister is illuminated and the front side of the blister is viewed. The light thus shines at least partly through the packaging.

The blister packaging according to the invention is characterized in that it has a semitransparent plastic foil molded part with a color change upon viewing in incident light (reflection), on the one hand, and upon viewing in transmitted light (transmission), on the other hand.

Since an object contained, e.g., in a cavity of the plastic foil molded part of the packaging, e.g. a tablet, lowers the light transmission, the viewer perceives the object upon viewing the packaging and looking onto the plastic foil molded part in transmitted light substantially in the reflection color of the cover foil (in particular in the case of a transparent cover foil being used). The region of the plastic foil molded part lying outside the object appears in the transmission color of the plastic foil molded part to the viewer.

In case of closing the plastic foil molded part with an opaque cover foil, e.g. an aluminum foil, the regions of the blister in which tablets are still present and the opaque cover foil is still present lead to a decrease of light transmission. In contrast to this, the regions of the blister with the tablets pushed through or removed and with absent opaque cover foil have an increased light transmission. The viewer perceives the regions of the blister in which tablets are still present, upon viewing the blister and looking onto the plastic foil molded part in transmitted light, substantially in the reflection color of the plastic foil molded part. The regions of the blister in which no tablets are present appear to the viewer, upon viewing the blister and looking onto the plastic foil molded part in transmitted light, in the transmission color of the plastic foil molded part.

The quick and uncomplicated discovering of the object contained in the blister packaging is advantageous in particular in the case of a pharmaceutical product, such as a tablet, e.g., as a life-saving immediate action or in the case of a disturbance of consciousness of the consumer by the influence of alcohol, influence of a disease or shock state.

In addition, the blister packaging of the invention is particularly advantageous because of its elevated forgery resistance, as semitransparent plastic foil molded parts with color change upon viewing in incident light, on the one hand, and upon viewing in transmitted light, on the other hand, are relatively hard to access for the forger. In addition, an uncomplicated authenticity check of the blister packaging of the invention can be performed without additional technical aids by the consumer, also when the consumer is a child, by viewing the blister packaging and looking onto the plastic foil molded part in incident light and in transmitted light.

For increasing the protection from forgery, the plastic foil molded part can be equipped with additional anti-forgery means, e.g.

the supplying of an additional opaque coating, in particular a printed layer or a metallization which has recesses in the form of patterns, characters or a coding;

the printing with (micro)writing, in particular with effect pigments;

the supplying of luminescent or magnetic security features which are detectable in particular by machine;

the supplying of an additional hologram, in particular an embossing lacquer layer with a diffractive relief structure which is provided, where applicable, with a metallization;

the supplying of a microoptical relief structure, in particular a micromirror arrangement; the production of a microoptical relief structure is known in the prior art (see e.g. WO 2014/060089 A2).

With regard to its material constitution the plastic foil molded part can be configured such that its mechanical and/or optical state as a result of oxidative processes or through humidity influence serves as a durability proof for the consumer. Thus, e.g. the semitransparent function layer may contain a metal which changes optically through the influence of oxygen and or humidity.

The transparent carrier substrate of the plastic foil molded part is based, e.g., on one of the following materials which can be respectively present as a single layer or in the form of several layers:
PVC (polyvinyl chloride),
PVDC (polyvinylidene chloride),
PVC/PVDC multi-layer arrangement,
PVC/PE/PVDC multi-layer arrangement,
PVC/ACLAR® multi-layer arrangement,
PP (polypropylene),
PET (polyester),
PS (polystyrene),
COP (cycloolefin polymer),
COC (cycloolefin copolymer),
COC/COC multi-layer arrangement,
PP/COC/PP multi-layer arrangement,
PP/COC/EVOH/PP multi-layer arrangement,
PETG/COC/PETG multi-layer arrangement,
PVC/COC/PVC multi-layer arrangement,
COC coated with PVDC,
PETG/PCTFE multi-layer arrangement,
PETG/EVOH/PCTFE multi-layer arrangement,
PVC/PCTFE multi-layer arrangement,
PVC/PE/PCTFE multi-layer arrangement,
PVC/PCTFE/PVC multi-layer arrangement, and
PVC/EVOH/PCTFE-multi-layer arrangement.

In the case that the transparent carrier substrate of the plastic foil molded part is based on a multi-layer arrangement, two single layers can be connected with each other in particular by means of an adhesive layer (e.g. PVDC/adhesive layer/PVC structure, PVDC/adhesive layer/PE/adhesive layer/PVC structure, or PP/adhesive layer/COC/adhesive layer/PP structure). Instead of an adhesive layer, for an improved connection of two single layers of a multi-layer arrangement there can be used a polymeric heat seal layer which is obtainable, e.g. by means of coextrusion. As a polymeric heat seal layer there is suitable, e.g., polyethylene copolymer.

The plastic foil molded part according to the invention, e.g., can have a material thickness in the region of 100 micrometers to 600 micrometers, wherein the region of 200 micrometers to 500 micrometers is preferred.

The transparent carrier substrate of the plastic foil molded part can be provided with the semitransparent function layer, e.g., on its back side (i.e. directed towards the packaged object) or on its front side (i.e. on the side opposing the packaged object). In the case that the transparent carrier substrate is based on a multi-layer arrangement, the semitransparent function layer can be present, e.g., in the interior of the multi-layer arrangement, i.e. an interior layer of the multi-layer arrangement can be provided with the semitransparent function layer on its front side or on its back side.

In the case that the semitransparent function layer is based on a multi-layer structure, in particular a part of the multi-layer structure can be present on the front side of the transparent carrier substrate of the plastic foil molded part and the other part of the multi-layer structure can be present on the back side of the transparent carrier substrate of the plastic foil molded part.

In the case that the semitransparent function layer is based on a multi-layer structure and the transparent carrier substrate of the plastic foil molded part is based on a multi-layer arrangement, in particular a part of the multi-layer structure of the semitransparent function layer can be present on the front side of a (in particular interior) layer of the transparent carrier substrate of the plastic foil molded part and the other part of the multi-layer structure of the semitransparent function layer can be present on the back side of the (in particular interior) layer of the transparent carrier substrate of the plastic foil molded part. In this way, the semitransparent function layer is excellently protected from external influences.

The semitransparent function layer has different color tones upon viewing in incident light, on the one hand, and upon viewing in transmitted light, on the other hand. The two different color tones are e.g. complementary colors. Such a semitransparent function layer is based e.g. on a multi-layer structure with two semitransparent metallic layers and a dielectric layer arranged between the two semitransparent metallic layers. Such a multi-layer structure which upon viewing in incident light appears golden and upon viewing in transmitted light shows a blue color tone is known e.g. from WO 2011/082761 A1. Moreover, WO 2011/032665 A1 describes similar multi-layer structures.

Suitable multi-layer structures with two semitransparent metallic layers and a dielectric layer arranged between the two semitransparent metallic layers preferably have the following material constitution:
the two semitransparent metallic layers are chosen preferably from Al or Ag; the dielectric layer is in particular an $SiO_2$ layer or an $MgF_2$ layer, preferably an $SiO_2$ layer;
if each of the two semitransparent metallic layers is based on Al, the respectively preferred layer thickness is in a range of 5 nm to 20 nm, particularly preferably in a range of 10 nm to 14 nm; the dielectric $SiO_2$ layer preferably has a layer thickness in a range of 50 nm to 450 nm, further preferably in a range of 80 nm to 260 nm and particularly preferably in a range of 210 nm to 260 nm, the ranges from 80 nm to 100 nm and from 210 nm to 240 nm being particularly preferred for the supply of a gold/blue color change;
if each of the two semitransparent metallic layers is based on Ag, the respectively preferred layer thickness is in a range of 15 nm to 30 nm, particularly preferably from 15 nm to 25 nm; the dielectric $SiO_2$ layer preferably has a layer thickness in a range of 50 nm to 450 nm, further preferably in a range of 80 nm to 260 nm and particularly preferably in a range of 210 nm to 260 nm, the ranges from 80 nm to 100 nm and from 210 nm to 240 nm being particularly preferred for the supply of a gold/blue color change.

The above-mentioned multi-layer structures with two semitransparent metallic layers and a dielectric layer arranged between the two semitransparent metallic layers can have a symmetrical three-layer structure, in which both the material and the layer thickness of the two semitransparent metallic layers are identical. Alternatively, however, there can also be present an asymmetrical three-layer structure, in which the material and/or the layer thickness of the two semitransparent metallic layers are different, e.g.
- a silver/dielectric/aluminum layer system in which the layer thicknesses of the silver layer and of the aluminum layer are identical or different;
- a silver/dielectric/silver layer system in which the layer thicknesses of the two silver layers are different;
- an aluminum/dielectric/aluminum layer system in which the layer thicknesses of the two aluminum layers are different.

The above-mentioned multi-layer layer structures do not only make possible the production of a semitransparent function layer which appears golden upon viewing in incident light and upon viewing in transmitted light shows a blue color tone, but there can also be produced, depending on the choice of the layer thickness in particular of the dielectric layer, further color changes, e.g.

in incident light magenta, in transmitted light blue-green;
in incident light turquoise, in transmitted light orange-yellow;
in incident light golden, in transmitted light blue-violet;
in incident light silver, in transmitted light violet.

A pharmaceutical manufacturer can utilize the different, above-mentioned color changes for the supply of its drugs in the form of different tablet packagings according to a defined color coding, e.g. the following color coding being conceivable:

headache tablets: tablet packaging with a plastic foil molded part which appears golden in incident light and blue in transmitted light;
tablets against stomach-ache: tablet packaging with a plastic foil molded part which appears turquoise in incident light and orange-yellow in transmitted light;
sleeping tablets: tablet packaging with a plastic foil molded part which appears magenta in incident light and blue-green in transmitted light.

In case of disturbance of consciousness, the above color coding enables the consumer to avoid, e.g., the inadvertent intake of tablets against stomach-ache instead of headache tablets.

A semitransparent function layer, which has different color tones upon viewing in incident light, on the one hand, and upon viewing in transmitted light, on the other hand, can further be based on an effect pigment composition. Printed layers on the basis of an effect pigment composition which upon viewing in incident light shows a different color than upon viewing in transmitted light, in particular a gold/blue color change, a gold/violet color change, a green-gold/magenta color change, violet/green color change or a silver/opaque color change are described, e.g., in WO 2011/064162 A2. The pigments preferably have a longest dimension ("longest dimension of edge length") from end to end in a range of 15 nm to 1000 nm and are based on a transition metal which is chosen from the group consisting of Cu, Ag, Au, Zn, Cd, Ti, Cr, Mn, Fe, Co, Ni, Ru, Rh, Pd, Os, Ir, and Pt. The transition metal is preferably Ag. The aspect ratio (i.e. the ratio of the longest dimension from end to end in relation to the thickness) is preferably at least 1.5, in particular in a range of 1.5 to 300. The ratio of binding agent and metal pigment is preferably below 10:1, in particular below 5:1. In dependence on the choice of the aspect ratio of the pigment, its longest dimension from end to end and the adjustment of the ratio of pigment/binding agent, the color upon viewing the printed layer in transmission and the color upon viewing in reflection can be adjusted (e.g. blue in transmission and silver, gold, bronze, copper or violet in reflection; moreover, also violet, magenta, pink, green or brown in transmission and various colors in reflection which depend on the choice of the ratio of pigment/binding agent). Colors with gold/blue color change between reflection and transmission (in other words, between viewing in incident light and in transmitted light) are stated, e.g., in the Examples 1, 2 and 3 in Table 1 of WO 2011/064162 A2. Furthermore, Example 4 shows a color with gold/violet color change, Example 5 a color with green-gold/magenta color change, Example 7 a color with violet/green color change and Example 8 a color with silver/opaque color change.

A pharmaceutical manufacturer can utilize the different, above-mentioned color changes for the supply of its drugs in the form of different tablet packagings according to a defined color coding, e.g. the following color coding being conceivable:

headache tablets: tablet packaging with a plastic foil molded part which appears golden in incident light and blue in transmitted light;
tablets against stomach-ache: tablet packaging a with plastic foil molded part which appears green-golden in incident light and magenta in transmitted light;
sleeping tablets: tablet packaging with a plastic foil molded part which appears violet in incident light and green in transmitted light.

In case of disturbance of consciousness, the above color coding enables the consumer to avoid, e.g., the inadvertent intake of tablets against stomach-ache instead of headache tablets.

A semitransparent function layer which upon viewing in incident light, on the one hand, and upon viewing in transmitted light, on the other hand, has different color tones, furthermore, can be based at least partly on the use of conventional color layers or color lacquers and be constituted according to one of the following variants:

1) two semitransparent metallic layers (e.g. 5 nm to 15 nm Al) and one intermediate color layer, preferably 1 to 2 micrometers thick (e.g. of blue color); preferably, the two semitransparent metallic layers are respectively additionally coated with a further color layer, preferably 1 to 2 micrometers thick, at the outer side, in particular in a complementary color to the color layer arranged between the metallic layers (e.g. in yellow color) (in this manner there arises the following layer structure with a gold/blue color change in a view in incident light or transmitted light: yellow printed layer-semitransparent metallic layer-blue printed layer-semitransparent metallic layer-yellow printed layer); furthermore, e.g., the following layer system comprising the layers a) to c) is possible: a) yellow colored, "silver" mirror layer obtainable by means of yellow colored metal pigments which are known from WO 2005/051675 A2 (the metal pigments are based on a metal which is chosen preferably from the group consisting of aluminum, stainless steel, nichrome, gold, silver, platinum and copper; the metal is particularly preferably aluminum, the average particle diameter being preferably in a range of 8 to 15 µm, further preferably in a range of 9 to 10 µm, measured with a Coulter LS130 laser diffraction granulometer; such a printing ink enables the supply of a "silver" mirror layer), b) blue color layer, preferably 1 to 2 micrometers thick, c) yellow colored, "silver" mirror layer obtainable by means of yellow colored metal pigments which are known from WO 2005/051675 A2 (see the description of layer a);
2) the above layer system can alternatively be configured in such a way that some of the layers are arranged on the front side of a carrier substrate layer of the plastic foil molded part (in particular an interior layer (e.g. COC) of a plastic foil molded part carrier substrate based on a multi-layer arrangement (e.g. PP/COC/PP)) and some layers are arranged on the back side of the carrier substrate layer of the plastic foil molded part; e.g., the following layer system comprising the layers a) to f) is possible: a) yellow color layer, preferably 1 to 2 micrometers thick, b) semitransparent metallic layer (e.g. aluminum), c) carrier substrate layer (e.g. COC), d) blue color layer, preferably 1 to 2 micrometers thick, e) semitransparent metallic layer (e.g. aluminum), f) yellow color layer, preferably 1 to 2 micrometers thick; furthermore, e.g., the following layer system comprising the layers a) to d) is possible: a) yellow colored, "silver" mirror layer obtainable by means of yellow colored metal pigments which are known from WO 2005/051675 A2 (the metal pigments are based on a metal which is chosen preferably from the group consisting of aluminum, stainless steel, nichrome, gold, silver, platinum and copper; the metal is particularly preferably aluminum, the average particle diameter being preferably in a range of 8 to 15 μm, further preferably in a range of 9 to 10 μm, measured with a Coulter LS130 laser diffraction granulometer; such a printing ink enables the supply of a "silver" mirror layer), b) carrier substrate layer (e.g. COC), c) blue color layer, preferably 1 to 2 micrometers thick, d) yellow colored, "silver" mirror layer obtainable by means of yellow colored metal pigments which are known from WO 2005/051675 A2 (see the description of layer a));

3) the layer systems mentioned above in 1) and 2) can, of course, be varied with respect to the yellow color layer and the blue color layer to the effect that different colors are used, instead of yellow or blue, which are in particular complementary to each other.

A plastic foil molded part utilizable for the blister packaging according to the invention can have, e.g., the following multi-layer structure:

polypropylene layer which on its side toward the following COC layer is provided with a semitransparent function layer (e.g., Al/SiO$_2$/Al layer sequence or Ag/SiO$_2$/Ag layer sequence, in particular with gold/blue color change upon viewing in incident light/transmitted light);
adhesive layer (optionally);
COC layer;
adhesive layer (optionally);
polypropylene layer.

A further plastic foil molded part utilizable for the blister packaging according to the invention can have, e.g., the following multi-layer structure:
polypropylene layer;
adhesive layer (optionally);
COC layer which on its side toward the following polypropylene layer is provided with a semitransparent function layer (e.g., Al/SiO$_2$/Al layer sequence or Ag/SiO$_2$/Ag layer sequence, in particular with gold/blue color change upon viewing in incident light/transmitted light);
adhesive layer (optionally);
polypropylene layer.

A further plastic foil molded part utilizable for the blister packaging according to the invention can have, e.g., the following multi-layer structure:
polypropylene layer;
adhesive layer (optionally);
yellow color layer, preferably 1 to 2 micrometers thick, which is printed on a semitransparent metallic layer made from aluminum which is located on a COC layer; on the opposite side of the COC layer there are located, in this order, a blue color layer, preferably 1 to 2 micrometers thick, then a semitransparent metallic layer made from aluminum and, finally, a yellow color layer, preferably 1 to 2 micrometers thick;
adhesive layer (optionally);
polypropylene layer.

A further plastic foil molded part utilizable for the blister packaging according to the invention can have, e.g., the following multi-layer structure:
polypropylene layer;
adhesive layer (optionally);
yellow colored "silver" mirror layer obtainable by means of yellow colored metal pigments which are known from WO 2005/051675 A2 and printed on a COC layer; on the opposite side of the COC layer there are located, in this order, a blue color layer, preferably 1 to 2 micrometers thick, and then a yellow colored "silver" mirror layer obtainable by means of yellow colored metal pigments which are known from WO 2005/051675 A2;
adhesive layer (optionally);
polypropylene layer.

For sealing the plastic foil molded part with the cover foil, the cover foil can have in particular a heat seal coating, e.g., a heat seal binding agent (herein also referred to as a heat seal lacquer) which is arranged on the cover foil by means of an optionally present adhesion promoter (herein also referred to as a heat seal lacquer priming). For drug blister packagings there is suitable, e.g., a combination of a PVC-based adhesion promoter and the heat seal binding agent with the trade name "DEGALAN® P24" commercially available from the Evonik company. For drug blister packagings there is also suitable, e.g., the heat seal binding agent with the trade name "DEGALAN® VP P34" based on hot-sealing-capable pearl polymers, commercially available from the Evonik company", for which a preceding priming with an adhesion promoter is not necessary.

A cover foil utilizable for the blister packaging according to the invention can have, e.g., a thickness in the range of 5 micrometers to 100 micrometers, preferably 5 micrometers to 60 micrometers, further preferably in the range of 10 micrometers to 30 micrometers, more preferably in the range of 15 micrometers to 25 micrometers.

The cover foil is in particular a push-through foil for a push-through packaging, in which the push-through foil locks the packaged good (e.g. pharmaceutical products, such as tablets) but can be torn open or broken open by pushing through the packaged good. The capability of breaking open can be additionally increased by mechanical impact, e.g., by means of perforations and or cutting grooves and/or thinned regions in the cover foil (which are obtainable, e.g., by means of embossing). The cover foil is preferably opaque, but transparent or semitransparent cover foils are also suitable. The cover foil is based in particular on one of the following materials:

suitable in particular for manufacturing opaque cover foils: aluminium, in particular hard aluminum, soft aluminum, paper aluminum combination or paper polyester aluminum laminate; aluminum is preferred in particular in the case of an opaque cover foil;

polyolefin resin; in particular polypropylene or polypropylene having an inorganic filler, the inorganic filler being, e.g., calcium carbonate, talc, aluminum oxide, titanium dioxide, diatomaceous earth, clay, kaolin, chalk, glass fiber or a mixture of two or several of the above-mentioned substances (depending on the filler content, in particular semitransparent or transparent cover foils can be obtained);

suitable in particular for manufacturing transparent cover foils: cycloolefin copolymer (COC) or cycloolefin polymer (COP); or films which contain at least one layer of cycloolefin copolymer (COC) or cycloolefin polymer (COP), e.g., films with the structure COC/PE/COC or COC/PE-LLD/COC or a film with a COC core layer (e.g., the following layer sequence: polymeric thermal protection layer (preferably chosen from COC, COP, PP, PA or PET)-COC core layer-polymeric heat seal layer), described in WO 2009/000403 A1 or in WO 2010/139409 A1;

oriented polyethylene terephthalate (OPET); or an OPET film which with a polyethylene layer or a polypropylene layer is combined into a laminate, and the laminate can have, where applicable, cutting grooves or notches;

suitable in particular for manufacturing transparent cover foils: polymer phase containing polyolefin (A), in which a hydrocarbon resin component (B) is contained in dissolved form, the hydrocarbon resin component (B) being different from the polyolefin (A) and comprising cyclic side groups at the polymer chain and being contained with a portion of at least 3 wt-% in the overall mass in the carrier substrate, the average molecular weight of the hydrocarbon resin component (B) being smaller or equal to 10000; as a polyolefin (A) there are preferred polyethylene, polypropylene or a copolymer or terpolymer of ethylene and/or propylene; component (B) is in particular an amorphous polymer; such push-through foils are known from DE 196 13 960 A1;

suitable in particular for manufacturing transparent cover foils: uniaxially oriented polypropylene film irradiated with ionising radiation.

Further embodiment examples as well as advantages of the invention will be explained hereinafter with reference to the strongly simplified Figures, in whose representation a rendition that is true to scale and to proportion has been dispensed with in order to increase the clearness.

BRIEF DESCRIPTION OF THE DRAWINGS

There are shown.

DETAILED DESCRIPTION OF VARIOUS EMBODIMENTS

FIGS. 1 to 4 illustrate the mode of function of a blister packaging of the invention according to a first to seventh embodiment example, wherein the cover foil is in each case opaque. The blister packaging in the present example is described with reference to a tablet blister.

First Embodiment Example

Figure 1:
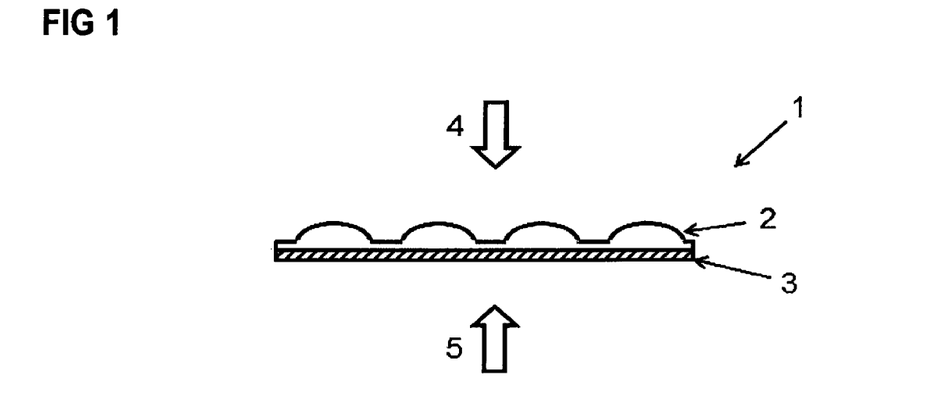
FIGS. 1 to 4 a blister packaging of the invention according to a first to seventh embodiment example.

FIG. 1 shows a tablet blister 1 which comprises a plastic foil molded part 2 and an opaque cover foil 3. The block arrow 4 symbolizes the viewing of the tablet packaging 1 from the front side, the block arrow 5 symbolizes the viewing of the tablet packaging 1 from the back side. The opaque cover foil 3 is based on an aluminum foil which is provided with a heat seal coating and has a thickness of 20 micrometers. The plastic foil molded part 2 is based on a thermo-formed plastic foil whose total thickness is 250 micrometers and which has the following structure:

polypropylene layer;
semitransparent function layer (20 nm Ag/240 nm $SiO_2$/20 nm Ag) with gold/blue color change upon viewing in incident light/transmitted light, which is obtainable by means of vapor deposition onto the preceding polypropylene layer;
adhesive layer;
COC layer with a thickness of 75 micrometers;
adhesive layer;
polypropylene layer.

Figure 2:
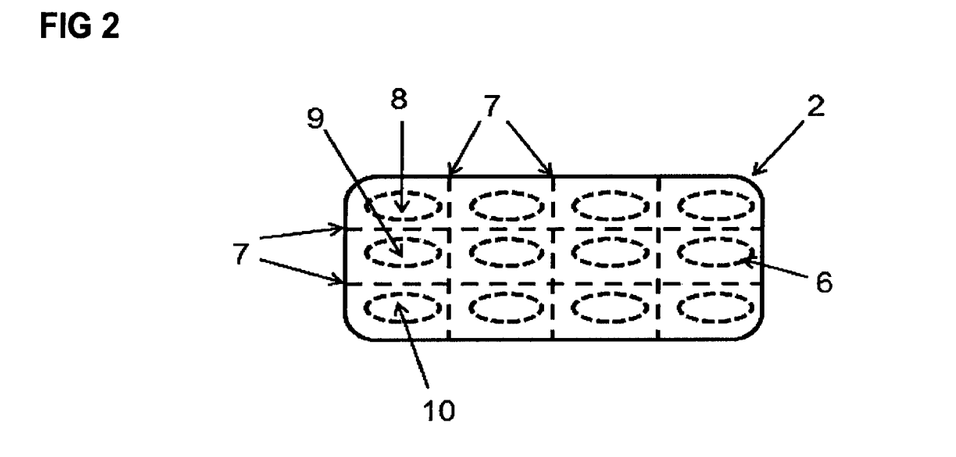

FIG. 2 shows the front side of the tablet blister 1, namely the plastic foil molded part 2, upon viewing in incident light. The viewer perceives the plastic foil molded part 2 in the form of a homogeneous, golden metallization. Reference sign 6 indicates in dashed form the cavities (or bubbles or depressions) in the plastic foil molded part 2. Reference sign 7 represents possibly present perforations. From the tablet blister 1 the consumer has already taken out the three left tablets originally present in the cavities 8, 9 and 10. Consequently, there are only nine tablets left, which are present in the remaining cavities.

Figure 3:
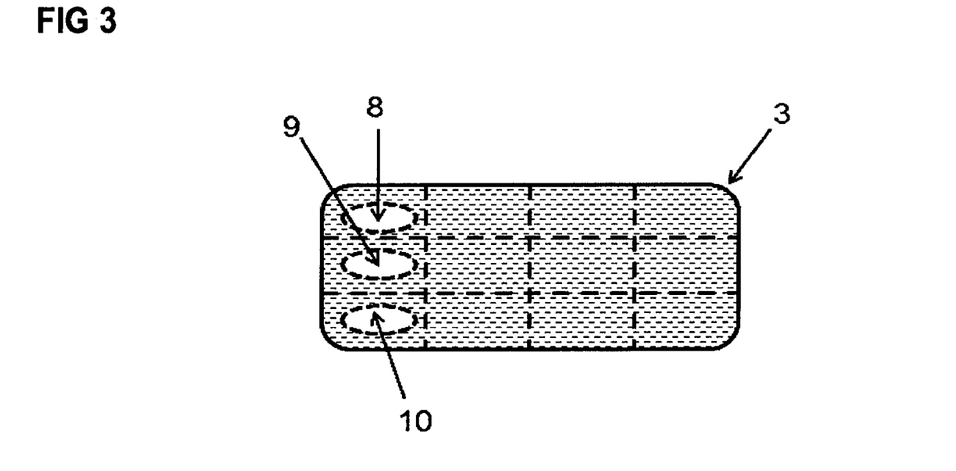

FIG. 3 shows the back side of the tablet blister 1, namely the opaque cover foil based on aluminum 3. In the region of the cavities 8, 9 and 10 of the tablet blister 1 the consumer has removed the tablets including the cover foil 3. In the region of the cavities 8, 9 and 10 the plastic foil molded part 2 is thus visible to the viewer.

Figure 4:
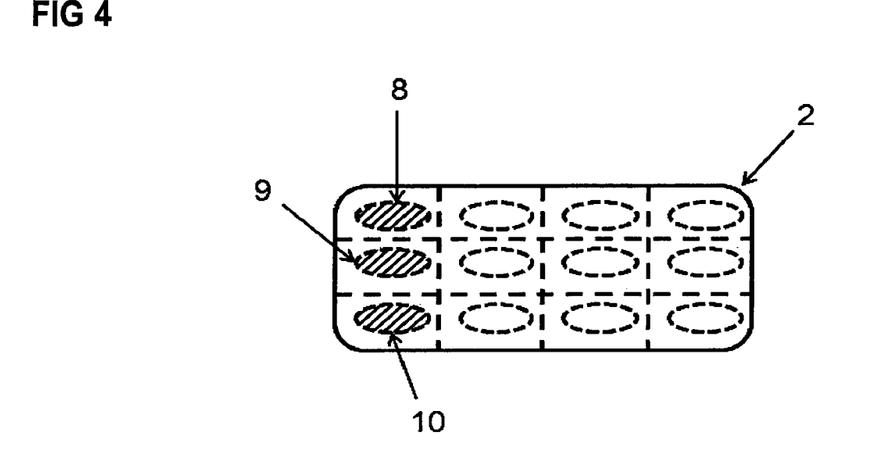

FIG. 4 shows the front side of the tablet blister 1, namely the plastic foil molded part 2 upon viewing in transmitted light. The viewer perceives the region of the cavities 8, 9 and 10, in which no tablets and no cover foil 3 is present, in bright blue. The rest of the plastic foil molded part 2 appears homogeneously in the form of a golden, metallic area to the viewer.

Second Embodiment Example

The second embodiment example is based on the first embodiment example. The plastic foil molded part is based on a thermo-formed plastic foil whose total thickness is 250 micrometers and which has the following structure:

polypropylene layer;
adhesive layer;
semitransparent function layer (20 nm Ag/240 nm $SiO_2$/20 nm Ag) with gold/blue color change upon viewing in incident light/transmitted light, which is obtainable by means of vapor deposition onto the following COC layer;
COC layer with a thickness of 75 micrometers;
adhesive layer;
polypropylene layer.

Third Embodiment Example

The third embodiment example is based on the first embodiment example. The plastic foil molded part was varied to the effect that the thermo-formed plastic foil has a total thickness of 250 micrometers and the COC core layer of the PP/COC/PP structure has a thickness of 190 micrometers.

Fourth Embodiment Example

The fourth embodiment example is based on the second embodiment example. The plastic foil molded part was varied to the effect that the thermo-formed plastic foil has a total thickness of 250 micrometers and the COC core layer of the PP/COC/PP structure has a thickness of 190 micrometers.

Fifth Embodiment Example

The fifth embodiment example is based on the first embodiment example. The plastic foil molded part was varied to the effect that the thermo-formed plastic foil has a total thickness of 250 micrometers and the COC core layer of the PP/COC/PP structure has a thickness of 125 micrometers.

Sixth Embodiment Example

The sixth embodiment example is based on the second embodiment example. The plastic foil molded part was varied to the effect that the thermo-formed plastic foil has a total thickness of 250 micrometers and the COC core layer of the PP/COC/PP structure has a thickness of 125 micrometers.

Seventh Embodiment Example

The seventh embodiment example is based on the first embodiment example. The plastic foil molded part is based on a thermo-formed plastic foil which has the following structure:
polypropylene layer with a thickness of 250 micrometers;
semitransparent function layer (20 nm Ag/240 nm $SiO_2$/20 nm Ag) with gold/blue color change upon viewing in incident light/transmitted light, which is obtainable by means of vapor deposition onto the preceding polypropylene layer;
optionally present polymeric thermal protection layer which is chosen, e.g., from the group consisting of COC, COP, polypropylene, polyamide and polyethylene terephthalate.

Eighth Embodiment Example

FIGS. 5 to 9 illustrate the mode of function of a blister packaging of the invention according to an eighth embodiment example, wherein the cover foil is transparent.

Figure 5:
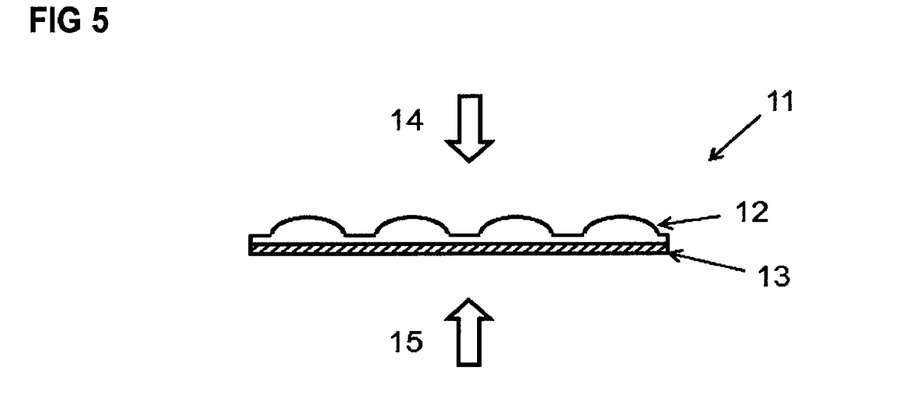
FIGS. 5 to 9 a blister packaging of the invention according to an eighth embodiment example.

FIG. 5 shows a tablet blister 11 which comprises a plastic foil molded part 12 and a transparent cover foil 13. The block arrow 14 symbolizes the viewing of the tablet packaging 11 from the front side, the block arrow 15 symbolizes the viewing of the tablet packaging 11 from the back side. The transparent cover foil 13 is based on a COC foil provided with a heat seal coating, for example described in WO 2009/000403 A1 or in WO 2010/139409 A1. The plastic foil molded part 12 is based on a thermo-formed plastic foil whose total thickness is 250 micrometers and which has the following structure:
polypropylene layer;
semitransparent function layer (20 nm Ag/240 nm $SiO_2$/20 nm Ag) with gold/blue color change upon viewing in incident light/transmitted light, which is obtainable by means of vapor deposition onto the preceding polypropylene layer;
adhesive layer;
COC layer with a thickness of 75 micrometers;
adhesive layer;
polypropylene layer.

Figure 6:
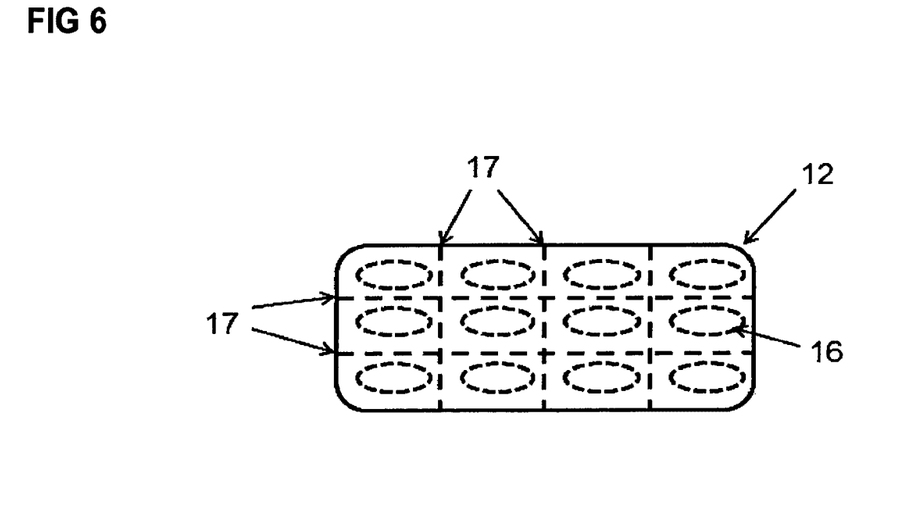

FIG. 6 shows the front side of the tablet blister 11, namely the plastic foil molded part 12, upon viewing in incident light. The viewer perceives the plastic foil molded part 12 in the form of a homogeneous, golden metallization. Reference sign 16 indicates in dashed form the cavities (or bubbles or depressions) in the plastic foil molded part 12. Reference sign 17 represents possibly present perforations. The consumer has not taken out any tablets from the tablet blister 11 yet, i.e. all cavities 16 are filled with tablets.

Figure 7:
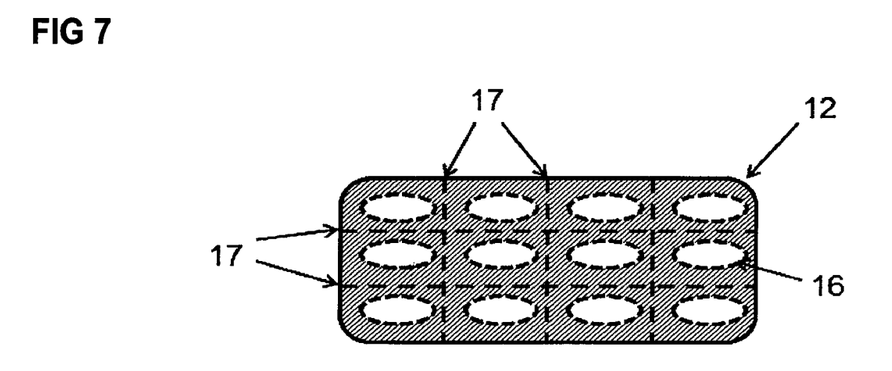

FIG. 7 shows the front side of the tablet blister 11, namely the plastic foil molded part 12, upon viewing in transmitted light. The viewer perceives the region of the cavities 16, in which tablets are present, in the form of a homogeneous, golden metallization. The viewer perceives the remaining region of the plastic foil molded part 12, which is represented by hatching, in bright blue.

Figure 8:
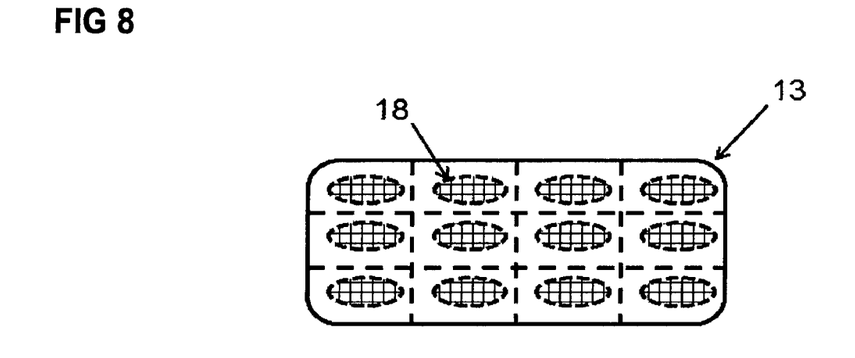

FIG. 8 shows the back side of the tablet blister 11, namely the transparent cover foil 13 based on cycloolefin copolymer (COC) upon viewing in incident light. All the cavities 16 of the tablet blister 11 are filled with tablets 18. The tablets 18 are visible to the viewer through the transparent cover foil 13. Through the transparent cover foil 13 there is additionally visible the plastic foil molded part 12 in the form of a homogeneous, golden metallization.

Figure 9:
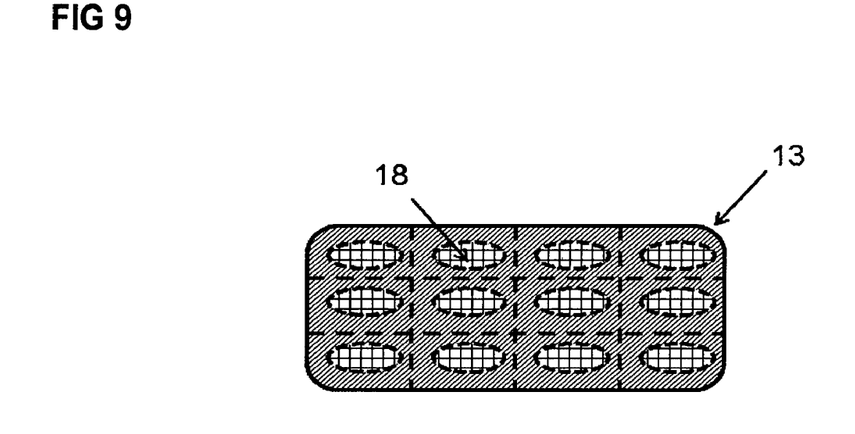

FIG. 9 shows the back side of the tablet blister 11, namely the transparent cover foil 13 based on cycloolefin copolymer (COC), upon viewing in transmitted light. All the cavities 16 of the tablet blister 11 are filled with tablets 18. The tablets 18 are visible to the viewer through the transparent cover foil 13. Through the transparent cover foil 13 there is additionally perceptible the plastic foil molded part 12 in a bright, blue color.

Ninth Embodiment Example

FIGS. 10 to 15 illustrate the mode of function of a blister packaging of the invention according to a ninth embodiment example, wherein the cover foil is transparent and the plastic foil molded part is a conventional, transparent plastic foil molded part. Between the cover foil and the plastic foil molded part there is located as an interply a transparent carrier substrate which is provided with a semitransparent function layer. The interply has recesses which are congruent with the cavities of the plastic foil molded part. All the cavities of the tablet blister are filled with tablets.

Figure 10:
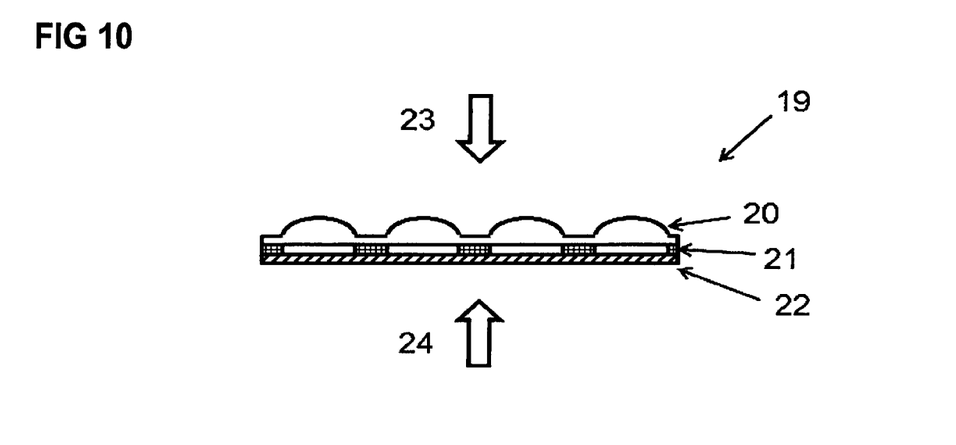
FIGS. 10 to 15 a blister packaging of the invention according to a ninth embodiment example.

FIG. 10 shows a tablet blister 19 which comprises a transparent, conventional plastic foil molded part 20 and a transparent cover foil 22. The block arrow 23 symbolizes the viewing of the tablet packaging 19 from the front side, the block arrow 24 symbolizes the viewing of the tablet packaging 19 from the back side. The transparent cover foil 22 is based on a COC foil provided with a heat seal coating, for example described in WO 2009/000403 A1 or in WO 2010/139409 A1. The plastic foil molded part 20 is, e.g., a commercially obtainable thermo-formed plastic foil whose total thickness is 250 micrometers and which has the following structure:
polypropylene layer;
adhesive layer;
COC layer with a thickness of 75 micrometers;
adhesive layer;
polypropylene layer.

The interply 21 is based on a transparent carrier substrate, namely on a polyethylene terephthalate foil which is provided with a semitransparent function layer (20 nm Ag/240 nm $SiO_2$/20 nm Ag) with gold/blue color change upon viewing in incident light/transmitted light. The semitransparent function layer is obtainable by means of vapor deposition onto the polyethylene terephthalate foil. The interply 21 has recesses which are congruent with the cavities of the plastic foil molded part 20. The interply 21 is bonded by means of (heat seal) adhesive layers to the plastic foil molded part 20, on the one hand, and to the cover foil 22, on the other hand.

Figure 11:
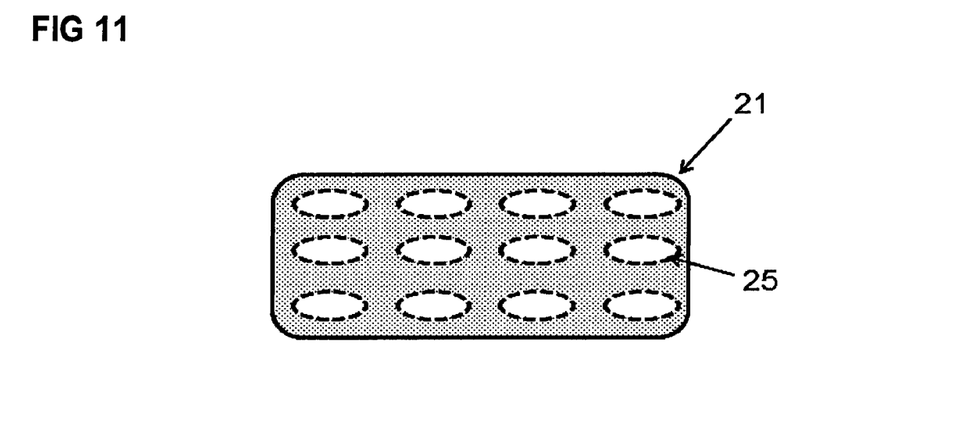

FIG. 11 shows the form of the interply 21 in plan view. The interply 21 has recesses 25 obtainable, e.g., by means of punching or by laser cutting, which are congruent with the cavities of the plastic foil molded part 20. The interply 21 appears to the viewer in metallic gold upon viewing in incident light, and in bright blue upon viewing in transmitted light.

Figure 12:
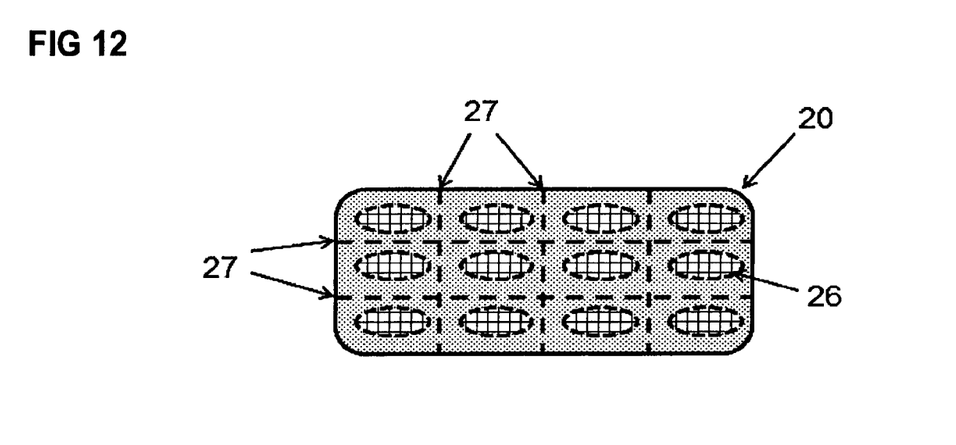

FIG. 12 shows the front side of the tablet blister 19, namely the plastic foil molded part 20, upon viewing in incident light. Reference sign 27 represents possibly present perforations. The ellipses represented in dashed form illustrate the cavities (or bubbles or depressions) in the plastic foil molded part 20. As a result of the transparent plastic foil molded part 20, of the transparent cover foil 22 and of the recesses 25 in the interply 21 the tablets 26 are visible to the viewer. The background of the tablets 26 appears in the form of a homogeneous, golden metallization to the viewer.

Figure 13:
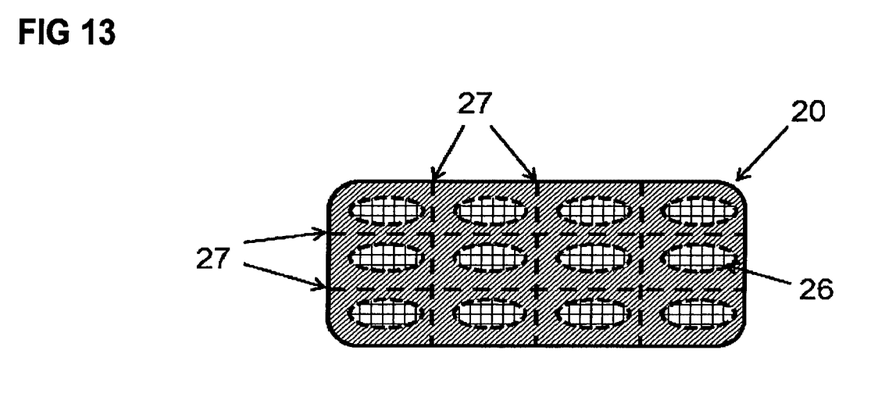

FIG. 13 shows the front side of the tablet blister 19, namely the plastic foil molded part 20, upon viewing in transmitted light. As a result of the transparent plastic foil molded part 20, of the transparent cover foil 22 and of the recesses 25 in the interply 21 the tablets 26 are visible to the viewer. The background of the tablets 26, which is represented by hatching, is perceived in bright blue by the viewer.

Figure 14:
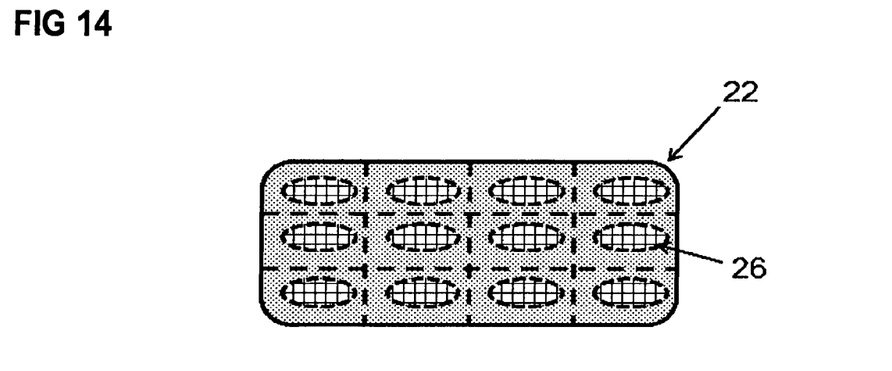

FIG. 14 shows the back side of the tablet blister 19, namely the transparent cover foil 22 based on cycloolefin copolymer (COC) upon viewing in incident light. As a result of the transparent plastic foil molded part 20, of the transparent cover foil 22 and of the recesses 25 in the interply 21 the tablets 26 are visible to the viewer. The background of the tablets 26 appears in the form of a homogeneous, golden metallization to the viewer.

Figure 15:
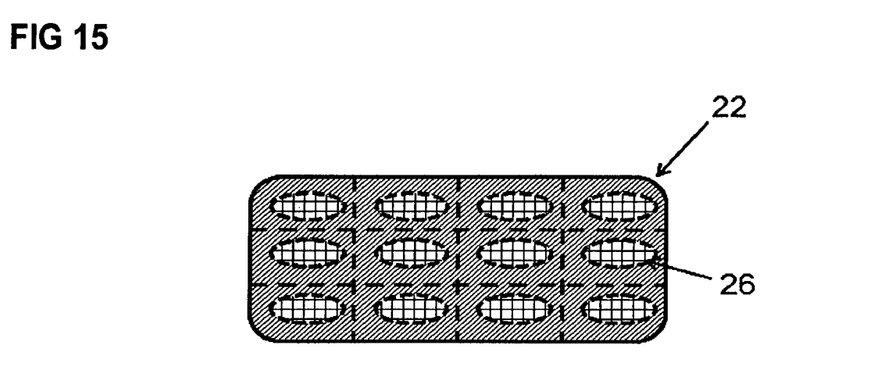

FIG. 15 shows the back side of the tablet blister 19, namely the transparent cover foil 22 based on cycloolefin copolymer (COC), upon viewing in transmitted light. As a result of the transparent plastic foil molded part 20, of the transparent cover foil 22 and of the recesses 25 in the interply 21 the tablets 26 are visible to the viewer. The background of the tablets 26 appears in bright blue to the viewer.

The invention claimed is:

1. A plastic foil molded part for a blister comprising
a transparent carrier substrate having a semitransparent function layer,
wherein the plastic foil molded part includes a plurality of cavities or depressions, each of the cavities or depressions being configured to respectively receive an object to be packed,
wherein the semitransparent function layer is constituted such that the plastic foil molded part
has a first, visually recognizable color upon viewing in incident light and
has a second, visually recognizable color upon viewing in transmitted light, and
wherein the semitransparent function layer has a multi-layer structure including two semitransparent metallic layers and a dielectric layer arranged between the two semitransparent metallic layers.

2. The plastic foil molded part according to claim 1, wherein the plastic foil molded part is constituted such that in the case of the presence of packaged objects, tablets, and the presence of an opaque cover foil closing the plastic foil molded part, a packaged object removed by the consumer is recognizable in the form of a motif formed by the first, visually recognizable color and the second, visually recognizable color upon viewing the plastic foil molded part from the side opposing the cover foil in transmitted light due to the absence of the opaque cover foil in the region of the removed object.

3. The plastic foil molded part according to claim 1, wherein the two semitransparent metallic layers are formed independently of each other from a metal and the metal is respectively chosen from the group consisting of Al, Ag, Ni, Cr, Cu, Au and an alloy of one or several of the hereinabove mentioned elements and the dielectric layer is an $SiO_2$ layer, a ZnO layer, an $Al_2O_3$ layer, a $TiO_2$ layer, a layer made of a nitride or oxynitride of one of the elements Si, Zn, Al or Ti, or an $MgF_2$ layer, or a nitrocellulose layer obtainable.

4. The plastic foil molded part according to claim 3, wherein the two semitransparent metallic layers are chosen from Al or Ag and the dielectric layer is an $SiO_2$ layer.

5. The plastic foil molded part according to claim 1, wherein the plastic foil molded part appears golden upon viewing in incident light and has a blue color tone upon viewing in transmitted light.

6. The plastic foil molded part according to claim 1, wherein the semitransparent function layer is obtainable by printing technology by means of an effect pigment composition.

7. A blister or blister packaging comprising a plastic foil molded part according to claim 1 and an opaque cover foil, wherein the plastic foil molded part defines the front side of the blister and the cover foil defines the back side of the blister.

8. The blister or blister packaging according to claim 7, wherein the cover foil is opaque and the blister is constituted such that the region of a packaged object, removed from the blister by the consumer, is recognizable in the form of a motif formed by the first, visually recognizable color and the second, visually recognizable color upon viewing the front side of the blister in transmitted light as a result of the part of the opaque cover foil no longer being present in this region.

9. The blister or blister packaging according to claim 7, wherein the blister is a blister for pharmaceutical products, a tablet packaging, or a tablet blister.

10. A method for manufacturing a plastic foil molded part according to claim 1, comprising:
   a) supplying a transparent carrier substrate;
   b) forming the transparent carrier substrate, by means of thermoforming; and
   c) providing the formed transparent carrier substrate with a semitransparent function layer.

11. The method according to claim 10, wherein in step c) the semitransparent function layer is applied by means of vapor deposition or by printing technology.

12. The method according to claim 10, wherein step c) is effected such that
   c1) a separate transparent carrier substrate which has a semitransparent function layer is supplied; and
   c2) the separate transparent carrier substrate having the semitransparent function layer is applied onto the formed transparent carrier substrate by means of HPF (high-pressure forming method) or by means of an adhesive layer.

13. A method for manufacturing a plastic foil molded part according to claim 1, comprising:
   a) supplying a transparent carrier substrate; or in the case that the transparent carrier substrate is based on a multi-layer arrangement, the step of supplying at least one layer of the multi-layer arrangement forming the transparent carrier substrate;
b) providing of the transparent carrier substrate with a semitransparent function layer; or in the case that the transparent carrier substrate is based on a multi-layer arrangement, the providing of the at least one layer of the multi-layer arrangement forming the transparent carrier substrate with a semitransparent function layer;
c) forming the transparent carrier substrate having the semitransparent function layer, obtained after the step b), by means of thermoforming.

14. The method according to claim 13, wherein in step b) the semitransparent function layer is applied by means of vapor deposition or by printing technology.

15. The plastic foil molded part according to claim 1, further comprising a plurality of perforations, cutting grooves, or thinned regions, wherein at least one of said perforations, cutting grooves, or thinned regions is arranged between each of the plurality of cavities or depressions.

16. A plastic foil molded part for a blister comprising
a transparent carrier substrate having a semitransparent function layer,
wherein the semitransparent function layer is constituted such that the plastic foil molded part has a first, visually recognizable color upon viewing in incident light and has a second, visually recognizable color upon viewing in transmitted light,
wherein the transparent carrier substrate of the plastic foil molded part is based on a multi-layer arrangement with at least two layers and the semitransparent function layer is arranged between the two layers, or the transparent carrier substrate of the plastic foil molded part is based on a multi-layer arrangement with at least one interior layer and two cover layers and the semitransparent function layer is arranged between the interior layer and one of the two cover layers,
wherein the multi-layer arrangement includes one or more of the following:
PVC/PVDC multi-layer arrangement,
PVC/PE/PVDC multi-layer arrangement,
PVC/poly-chloro-trifluoroethylene multi-layer arrangement,
COC/COC multi-layer arrangement,
PP/COC/PP multi-layer arrangement,
PP/COC/EVOH/PP multi-layer arrangement,
PETG/COC/PETG multi-layer arrangement,
PVC/COC/PVC multi-layer arrangement,
COC coated with PVDC,
PETG/PCTFE multi-layer arrangement,
PETG/EVOH/PCTFE multi-layer arrangement,
PVC/PCTFE multi-layer arrangement,
PVC/PE/PCTFE multi-layer arrangement,
PVC/PCTFE/PVC multi-layer arrangement, or
PVC/EVOH/PCTFE-multi-layer arrangement.

17. The plastic foil molded part according to claim 16, wherein the transparent carrier substrate of the plastic foil molded part is based on a multi-layer arrangement with at least one interior layer and two cover layers and the semitransparent function layer is arranged between the interior layer and one of the two cover layers,
wherein the interior layer is a COC layer and the two cover layers respectively are a PP layer.

* * * * *